(12) United States Patent
Ito

(10) Patent No.: US 7,908,499 B2
(45) Date of Patent: Mar. 15, 2011

(54) SEMICONDUCTOR INTEGRATED CIRCUIT COMPRISING MASTER-SLAVE FLIP-FLOP AND COMBINATIONAL CIRCUIT WITH PSEUDO-POWER SUPPLY LINES

(75) Inventor: Minoru Ito, Shiga (JP)

(73) Assignee: Panasonic Corporation, Osaka (JP)

(*) Notice: Subject to any disclaimer, the term of this patent is extended or adjusted under 35 U.S.C. 154(b) by 851 days.

(21) Appl. No.: 11/898,699

(22) Filed: Sep. 14, 2007

(65) Prior Publication Data

US 2008/0178020 A1 Jul. 24, 2008

(30) Foreign Application Priority Data

Sep. 20, 2006 (JP) ................................. 2006-254402

(51) Int. Cl.
G06F 1/32 (2006.01)
(52) U.S. Cl. .......... 713/320; 327/211; 327/544; 365/227
(58) Field of Classification Search .................. 713/320; 327/211, 544; 365/227
See application file for complete search history.

(56) References Cited

U.S. PATENT DOCUMENTS

| | | | |
|---|---|---|---|
| 7,023,058 B2 | 4/2006 | Kanno et al. | |
| 7,080,270 B2 * | 7/2006 | Yokozeki et al. | 713/320 |
| 7,359,277 B2 * | 4/2008 | Hardee | 365/230.06 |
| 7,649,405 B2 * | 1/2010 | Wang et al. | 327/544 |
| 2003/0188241 A1 * | 10/2003 | Zyuban et al. | 714/726 |
| 2006/0053314 A1 | 3/2006 | Hashidate | |

OTHER PUBLICATIONS

Min, K., et al., "Zigzag Super Cut-off CMOS (ZSCCMOS) Block Activation with Self-Adaptive Voltage Level Controller: An Alternative to Clock-Gating Scheme in Leakage Dominant Era", 2003 IEEE International Solid-State Circuits Conference, Session 22, TD: Embedded Technologies, Paper 22.8.

* cited by examiner

Primary Examiner — Albert Wang
(74) Attorney, Agent, or Firm — McDermott Will & Emery LLP

(57) ABSTRACT

In a semiconductor integrated circuit device using a ZSCC-MOS circuit, a combinational circuit includes a plurality of logic gate circuits, and receives an output of a data holding circuit. The data holding circuit can continue to hold data during cut-off of power supply, and when receiving a predetermined value as a control signal, outputs a predetermined fixed value. A logic gate circuit which outputs "L" when the output of the data holding circuit has the predetermined fixed value has power supply ends connected to a pseudo-power supply line $V_{DDV}$ and a low potential power supply line $V_{SS}$. A logic gate circuit which outputs "H" when the output of the data holding circuit has the predetermined fixed value has power supply ends connected to a high potential power supply line $V_{DD}$ and a pseudo-power supply line $V_{SSV}$.

4 Claims, 10 Drawing Sheets

FIG. 2

SEMICONDUCTOR INTEGRATED CIRCUIT COMPRISING MASTER-SLAVE FLIP-FLOP AND COMBINATIONAL CIRCUIT WITH PSEUDO-POWER SUPPLY LINES

CROSS REFERENCE TO RELATED APPLICATIONS

This Non-provisional application claims priority under 35 U.S.C. §119(a) on Patent Application No. 2006-254402 filed in Japan on Sep. 20, 2006, the entire contents of which are hereby incorporated by reference.

BACKGROUND OF THE INVENTION

1. Field of the Invention

The present invention relates to a technique of achieving low power consumption of a semiconductor integrated circuit by controlling power.

2. Description of the Related Art

Conventionally, it is known to use a Zigzag Super Cut-off CMOS (ZSCCMOS) circuit or a Zigzag Boosted Gate MOS (ZBGMOS) circuit in order to achieve low power consumption of a semiconductor integrated circuit.

FIG. 8 shows a circuit configuration of a ZSCCMOS circuit. As shown in FIG. 8, the ZSCCMOS circuit includes a combinational circuit 50 for which power supply is to be cut off. In the combinational circuit 50, a high potential-side power supply end of a logic gate circuit which outputs "L" immediately before cut-off of power supply is connected to a pseudo-power supply line $V_{DDV}$ connected via a power control transistor MP to a high potential power supply line $V_{DD}$, while a low potential-side power supply end thereof is connected to a low potential power supply line $V_{SS}$. A high potential-side power supply end of a logic gate circuit which outputs "H" immediately before cut-off of power supply is connected to the high potential power supply line $V_{DD}$, while a low potential-side power supply end thereof is connected to another pseudo-power supply line $V_{SSV}$ connected via a power control transistor MN to the low potential power supply line $V_{SS}$.

With this circuit configuration, the gate-drain voltage of the power control transistor can be maintained low, and a state of the combinational circuit 50 during restoration of power supply can be quickly settled (see Kyeong-sik Min et. al, "Zigzag Super Cut-off CMOS (ZSCCMOS) Block Activation with Self-Adaptive Voltage Level Controller: An Alternative to Clock-Gating Scheme in Leakage Dominant Era", 2003 IEEE International Solid-State Circuits Conference, session 22, TD: Embedded Technologies, Paper 22.8 (hereinafter referred to as Non-Patent Document 1)).

However, the above-described low power consumption circuit technique has the following problems.

In order to achieve the circuit configuration as shown in FIG. 8, the output of each logic gate in the combinational circuit 50 needs to be settled as "H" or "L" immediately before cut-off of power supply which turns off the power control transistor. Therefore, Non-Patent Document 1 describes a circuit configuration as shown in FIG. 9 which is a flip-flop circuit which supplies an output to the combinational circuit 50. In the circuit configuration of FIG. 9, an asynchronous reset signal or set signal is externally input so that the output of the flip-flop circuit can be forcedly fixed to "L" or "H". However, in the circuit configuration of FIG. 9, the flip-flop circuit is set into the initial state immediately before cut-off of power supply which turns off the power control transistor. Therefore, the flip-flop circuit cannot continue to hold data which was held. Therefore, when power supply is restored, the state of the combinational circuit 50 cannot be put back to a state as it was before cut-off of power supply, but is invariably initialized.

Non-Patent Document 1 also describes a circuit configuration as shown in FIG. 10. In the circuit configuration of FIG. 10, data is held at the Q output (slave latch circuit) of a flip-flop circuit. Specifically, a clocked inverter G102 and an inverter G103 each comprise a high-threshold voltage MOS transistor. Power supply ends of each inverter are connected to the high potential power supply line $V_{DD}$ and the low potential power supply line $V_{SS}$, respectively, so that data can be held even when the power control transistor is turned off. In a clocked inverter G101, a power control transistor is inserted between each power supply end and the power supply so that the output of a master latch circuit is cut off when the power control transistor is turned off.

However, in the configuration of FIG. 10, since the Q-output data is held, the output of the flip-flop circuit can be either "H" or "L". In other words, the output of the flip-flop circuit when power supply is cut off, is not invariably "H" or "L". Therefore, the output of each logic gate circuit in the combinational circuit 50 cannot be uniquely fixed, so that, during circuit design, it cannot be determined whether the power supply end of each logic gate circuit should be connected to the power supply line or the pseudo-power supply line, which is a serious problem.

SUMMARY OF THE INVENTION

In view of the above-described problems, the present invention has been achieved. An object of the present invention is to provide a semiconductor integrated circuit device using a ZSCCMOS circuit in which, when power supply is cut off, the output of each logic gate circuit in a combinational circuit is put into a desired state, and when power supply is restored, the combinational circuit is reliably put back to a state as it was before cut-off of power supply.

A semiconductor integrated circuit device of the present invention comprises at least one data holding circuit, a combinational circuit including a plurality of logic gate circuits and for receiving an output of the data holding circuit, a high potential power supply line and a low potential power supply line, a first pseudo-power supply line connected via a first power control transistor to the high potential power supply line, and a second pseudo-power supply line connected via a second power control transistor to the low potential power supply line. Of the logic gate circuits of the combinational circuit, one outputting "L" when the output of the data holding circuit has a predetermined fixed value has a high potential-side power supply end connected to the first pseudo-power supply line and a low potential-side power supply end connected to the low potential power supply line, and one outputting "H" when the output of the data holding circuit has the predetermined fixed value has a high potential-side power supply end connected to the high potential power supply line and a low potential-side power supply end connected to the second pseudo-power supply line. The data holding circuit can continue to hold data during cut-off of power supply which turns off the first and second power control transistors. The data holding circuit receives a control signal, and when obtaining a predetermined value as the control signal, the data holding circuit can output the predetermined fixed value.

According to the present invention, the data holding circuit can continue to hold data during cut-off of power supply, and therefore, when power supply is restored, can output data as it was held before cut-off of power supply. Therefore, the combinational circuit which receives the output of the data holding circuit can be reliably and quickly put back to a state as it was before cut-off of power supply. Also, the data holding circuit, when receiving a predetermined value as a control signal, can output a predetermined fixed value, and therefore, when receiving the predetermined value as a control signal before cut-off of power supply, outputs the predetermined fixed value. Therefore, the combinational circuit which receives the output of the data holding circuit receives a predetermined fixed value before cut-off of power supply, so that a logic gate circuit having a high potential-side power supply end connected to the first pseudo-power supply line and a low potential-side power supply end connected to the low potential power supply line outputs "L", while a logic gate circuit having a high potential-side power supply end connected to the high potential power supply line and a second pseudo-power supply line connected to the low potential-side power supply end outputs "H". In other words, the output of each logic gate circuit goes to a desired state which was assumed during circuit design.

The present invention also provides an electronic device which comprises the semiconductor integrated circuit device of the present invention and a power supply device for supplying power to the semiconductor integrated circuit device.

According to the present invention, when power supply is cut off, the data of the data holding circuit is held and a predetermined fixed value is output from the data holding circuit, so that the output of each logic gate in the combinational circuit goes to a desired state, and when power supply is restored, the state of the combinational circuit can be reliably and quickly put back to a state as it was before cut-off of power supply.

BRIEF DESCRIPTION OF THE DRAWINGS

FIG. 2 is a circuit diagram showing an exemplary configuration of a flip-flop circuit according to Embodiment 1 of the present invention.

DETAILED DESCRIPTION OF THE PREFERRED EMBODIMENTS

Hereinafter, embodiments of the present invention will be described with reference to the accompanying drawings.

Note that, in the following description, MOS (Metal Oxide Semiconductor) transistors, which are representative MIS (Metal Insulated Semiconductor) transistors, are used as transistors constituting a circuit.

Embodiment 1

Figure 1:
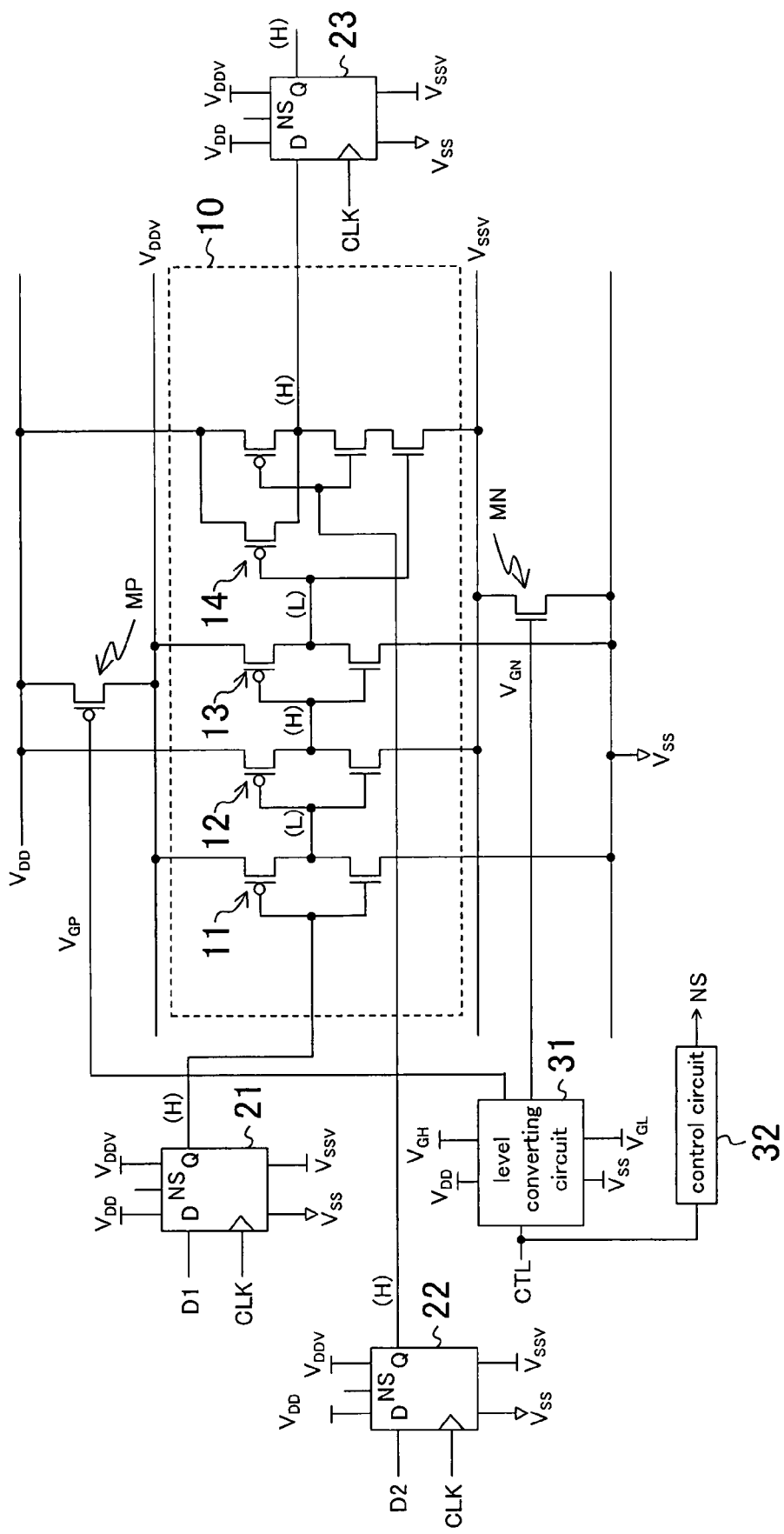
FIG. 1 is a diagram showing a circuit configuration of a semiconductor integrated circuit device according to Embodiment 1 of the present invention.

FIG. 1 is a diagram showing a circuit configuration of a semiconductor integrated circuit device according to Embodiment 1 of the present invention. In FIG. 1, a ZSCCMOS circuit or a ZBGMOS circuit is provided.

In FIG. 1, a high potential power supply line $V_{DD}$, a low potential power supply line $V_{SS}$, a first pseudo-power supply line $V_{DDV}$ connected via a first power control transistor MP to the high potential power supply line $V_{DD}$, and a second pseudo-power supply line $V_{SSV}$ connected via a second power control transistor MN to the low potential power supply line $V_{SS}$ are provided. Note that the reference symbols $V_{DD}$ and $V_{SS}$ each indicate both a power supply line itself and a power supply voltage supplied to the power supply line.

A combinational circuit 10 comprises a plurality of logic gate circuits 11, 12, 13 and 14. The combinational circuit 10 receives outputs of flip-flop circuits 21 and 22 which are data holding circuits, and supplies an output to a flip-flop circuit 23.

When the output of the flip-flop circuit 21 is "H" as a predetermined fixed value and the output of the flip-flop circuit 22 is "H" as a predetermined fixed value, the logic gate circuits 11 and 13 of the combinational circuit 10 output "L" while the logic gate circuits 12 and 14 of the combinational circuit 10 output "H". High potential-side power supply ends of the logic gate circuits 11 and 13 which output "L" are connected to the first pseudo-power supply line $V_{DDV}$, while low potential-side power supply ends thereof are connected to the low potential power supply line $V_{SS}$. On the other hand, high potential-side power supply ends of the logic gate circuits 12 and 14 which output "H" are connected to the high potential power supply line $V_{DD}$, while low potential-side power supply ends thereof are connected to the second pseudo-power supply line $V_{SSV}$.

A level converting circuit 31 supplies signals $V_{GP}$ and $V_{GN}$ to the gates of the first and second power control transistors MP and MN, respectively, to control on/off of these transistors. When the first and second power control transistors MP and MN are turned off, power supply is cut off with respect to the combinational circuit 10 and the flip-flop circuits 21, 22 and 23.

Here, $V_{GH}$ and $V_{GL}$ as well as $V_{DD}$ and $V_{SS}$ are applied as power supply voltages to the level converting circuit 31. $V_{GH}$ is higher than or equal to the high potential power supply voltage $V_{DD}$, while $V_{GL}$ is lower than or equal to the low potential power supply voltage $V_{SS}$. In other words, the following relationship is established:

$$V_{GH} \geq V_{DD} \text{ and } V_{GL} \leq V_{SS}.$$

When the absolute values of threshold voltages of the first and second power control transistors MP and MN are higher than the absolute values of threshold voltages of transistors constituting the combinational circuit 10, $V_{SS}$ having the low level and $V_{GH}$ having the high level are applied to the signal $V_{GN}$, while $V_{DD}$ having the high level and $V_{GL}$ having the low level are applied to the signal $V_{GP}$. By setting the high level $V_{GH}$ of the signal $V_{GN}$ to be higher than or equal to $V_{DD}$ and the low level $V_{GL}$ of the signal $V_{GP}$ to be lower than or equal to $V_{SS}$, the on-resistances of the first and second power control transistors MP and MN can be reduced.

Alternatively, when the absolute values of the threshold voltages of the first and second power control transistors MP and MN are set to be lower than or equal to the absolute values of the threshold voltages of the transistors constituting the combinational circuit 10 or the first and second power control transistors MP and MN are of a depression type, $V_{GL}$ having the low level and $V_{DD}$ having the high level are applied to the signal $V_{GN}$, while $V_{GH}$ having the high level and $V_{SS}$ having the low level to the signal $V_{GP}$. By setting the low level $V_{GL}$ of the signal $V_{GN}$ to be lower than or equal to $V_{SS}$ and the high level $V_{GH}$ of the signal $V_{GP}$ to be higher than or equal to $V_{DD}$, the off-leakage currents of the first and second power control transistors MP and MN can be reduced. If the breakdown voltages of the gates of the first and second power control transistors MP and MN are sufficient, by setting the high level of the signal $V_{GN}$ to be $V_{GH}$ and the low level of the signal $V_{GP}$ to be $V_{GL}$, the on-resistances of the first and second power control transistors MP and MN can be reduced.

The flip-flop circuits 21 and 22 are configured so that data can continue to be held when power supply is cut off, i.e., the first and second power control transistors MP and MN are turned off. The flip-flop circuits 21 and 22 are also configured so that, when receiving a control signal NS and obtaining a predetermined value (here, "L") as the control signal NS, they output "H" as a predetermined fixed value. The flip-flop circuit 23 is also similarly configured. A control circuit 32 supplies the control signal NS to each of the flip-flop circuits 21, 22 and 23.

Figure 2:
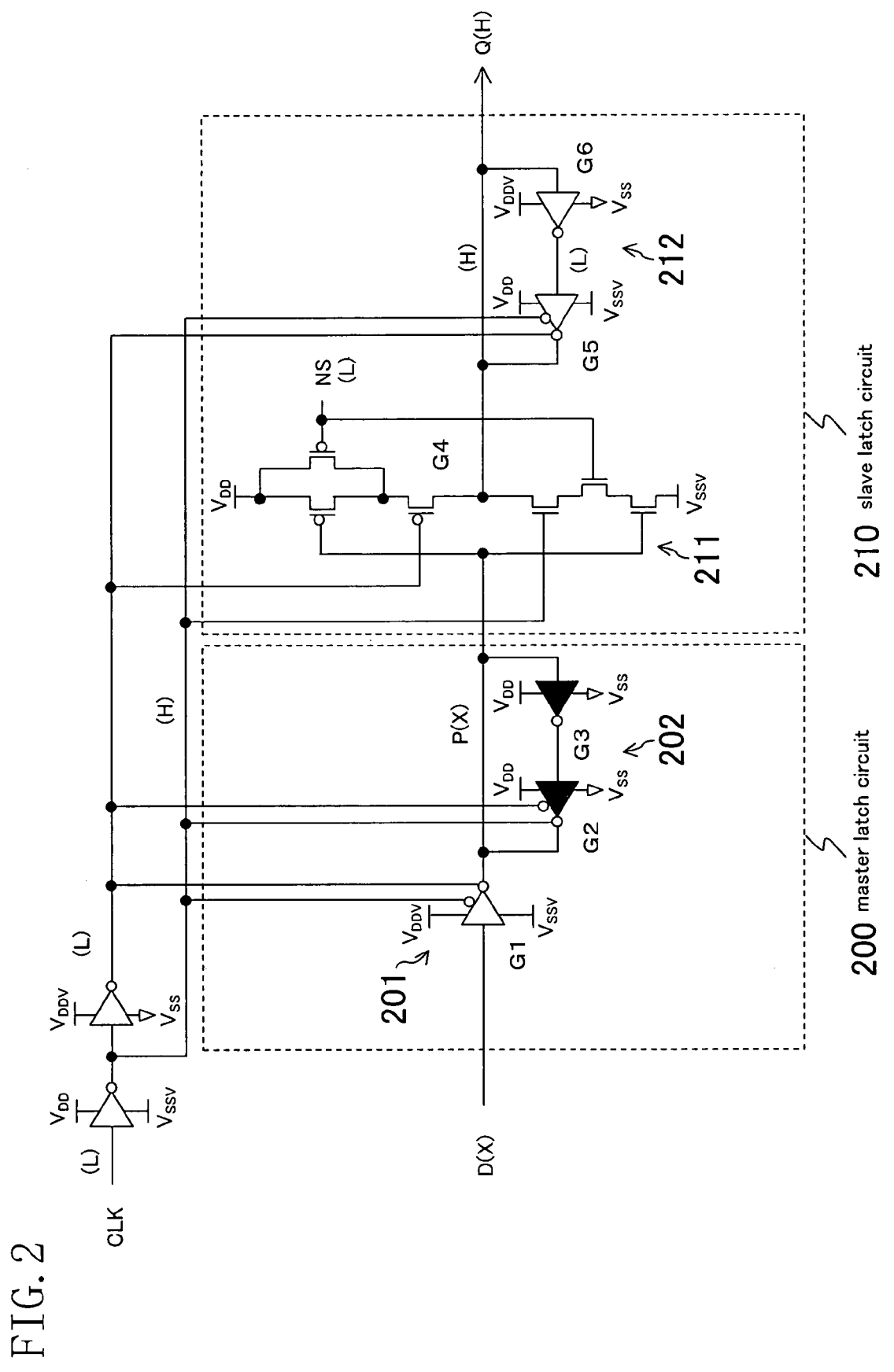

FIG. 2 is a circuit diagram showing an exemplary configuration of a flip-flop circuit according to this embodiment. In the configuration of FIG. 2, the flip-flop circuit comprises a master latch circuit 200 and a slave latch circuit 210. The master latch circuit 200 holds data when power supply is cut off, while the slave latch circuit 210 outputs "H" when the control signal NS is "L".

In FIG. 2, the master latch circuit 200 comprises a first logic gate circuit 201 which receives a D input, and a first data holding inverter circuit 202 which holds an output of the first logic gate circuit 201. The first logic gate circuit 201 comprises a clocked inverter G1. A high potential-side power supply end and a low potential-side power supply end of the clocked inverter G1 are connected to the first and second pseudo-power supply lines $V_{DDV}$ and $V_{SSV}$, respectively. The first data holding inverter circuit 202 comprises a clocked inverter G2 and an inverter G3. The clocked inverter G2 and the inverter G3 each comprise a MOS transistor having a high threshold voltage. A high potential-side power supply end and a low potential-side power supply end of each of the clocked inverter G2 and the inverter G3 are connected to the high potential power supply line $V_{DD}$ and the low potential power supply line $V_{SS}$, respectively. Thereby, the first data holding inverter circuit 202 can hold data during cut-off of power supply.

The slave latch circuit 210 comprises a second logic gate circuit 211 which receives an output of the master latch circuit 200 and a second data holding inverter circuit 212 which holds an output of the second logic gate circuit 211. The second logic gate circuit 211 comprises a clocked NAND circuit G4 which receives the control signal NS through one input thereof. In other words, the second logic gate circuit 211 has a set function which is controlled by the control signal NS, and outputs "H" when the control signal NS is "L". A low potential-side power supply end of the clocked NAND circuit G4 is connected to the second pseudo-power supply line $V_{SSV}$. The second data holding inverter circuit 212 comprises a clocked inverter G5 and an inverter G6. A high potential-side power supply end of the clocked inverter G5 is connected to the high potential power supply line $V_{DD}$, while a low potential-side power supply end thereof is connected to the second pseudo-power supply line $V_{SSV}$. A high potential-side power supply end of the inverter G6 is connected to the first pseudo-power supply line $V_{DDV}$, while a low potential-side power supply end thereof is connected to the low potential power supply line $V_{SS}$.

Figure 3:
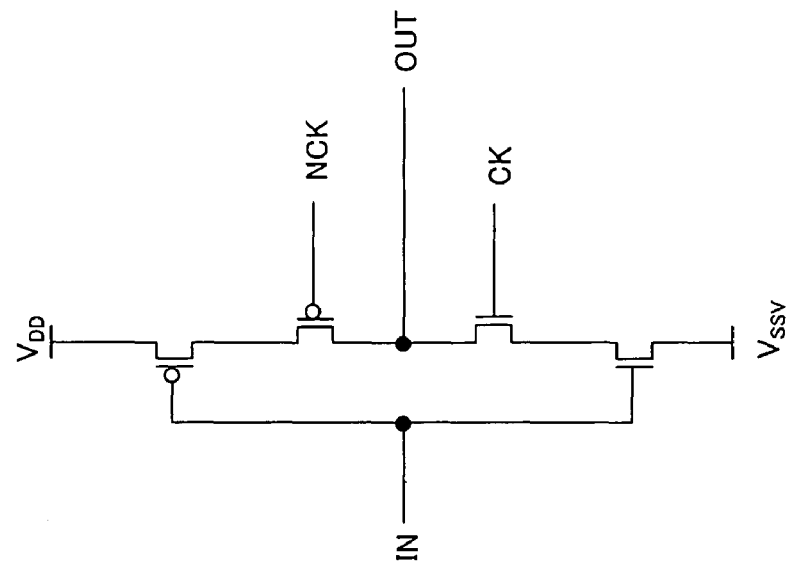
FIG. 3 is a diagram showing an exemplary specific circuit configuration of a clocked inverter circuit.
Figure 3:
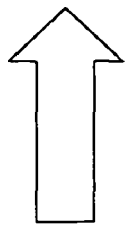
Figure 3:
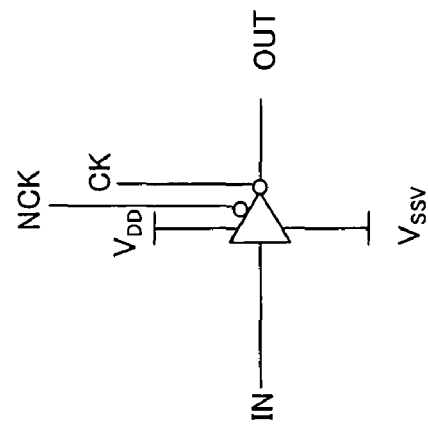

FIG. 3 is a diagram showing an exemplary specific circuit configuration of a clocked inverter.

Hereinafter, an operation of the thus-configured semiconductor integrated circuit device will be described.

When power supply is cut off, the level converting circuit 31 turns off the first and second power control transistors MP and MN using gate voltages $V_{GP}$ and $V_{GN}$ in accordance with a signal CTL. A clock signal CLK is set to be "L" immediately before the first and second power control MOS transistors MP and MN are turned off. In this case, the D input is not uniquely determined to be "H" or "L". Also, in this case, the control circuit 32 sets the control signal NS to be "L".

When the clock signal CLK goes to "L", the output of the clocked inverter circuit G1 included in the first logic gate circuit 201 of the master latch circuit 200 goes to a Hi-Z (high impedance) state. The power supply ends of each of the clocked inverters G2 and the inverter G3 of the first data holding inverter circuit 202 are directly connected to the high potential power supply line $V_{DD}$ and the low potential power supply line $V_{SS}$ and thereby are invariably supplied with power. Therefore, the master latch circuit 200 can continue to hold data. The transistors included in the clocked inverter G2 and the inverter G3 have a sufficiently high threshold voltage, so that there is not a particular problem with leakage of power supply.

The control circuit 32 sets the control signal NS to be "L" immediately before turning off the first and second power control transistors MP and MN. Thereby, in the slave latch circuit 210, the clocked NAND circuit G4 included in the second logic gate circuit 211 outputs "H" since the control signal NS which is provided to one input thereof goes to "L". The output of the clocked inverter G5 included in the second data holding inverter circuit 212 goes to the Hi-Z state. Therefore, the slave latch circuit 210 can output "H" as the Q output.

Since the flip-flop circuits 21 and 22 output "H" during cut-off of power supply, the outputs of the logic gate circuits 11 and 13 output "L" while the logic gate circuits 12 and 14 output "H" in the combinational circuit 10. Therefore, circuit design is determined as follows: the high potential-side power supply ends of the logic gate circuits 11 and 13 may be connected to the first pseudo-power supply line $V_{DDV}$, while the low potential-side power supply ends thereof may be connected to the low potential power supply line $V_{SS}$; and the high potential-side power supply ends of the logic gate circuits 12 and 14 may be connected to the high potential power supply line $V_{DD}$, while the low potential-side power supply ends thereof may be connected to the second pseudo-power supply line $V_{SSV}$.

On the other hand, when power supply is restored, the level converting circuit 31 turns on the first and second power control transistors MP and MN using the gate voltages $V_{GP}$ and $V_{GN}$ in accordance with the signal CTL. Also, in this case, the control circuit 32 sets the control signal NS to be "H". Since data continues to be held during cut-off of power supply in the flip-flop circuits 21 and 22, data corresponding to the held data is output as the Q output from the flip-flop circuits 21 and 22 when power supply is restored. Therefore, the internal state of the combinational circuit 10 is quickly put back to a state as it was immediately before cut-off of power supply.

Thus, according to this embodiment, the flip-flop circuits 21 and 22 can continue to hold data during cut-off of power supply, so that data as it was held before cut-off of power supply can be output when power supply is restored. Therefore, when power supply is restored, the combinational circuit 10 is reliably and quickly put back to a state as it was before cut-off of power supply. Also, the flip-flop circuits 21 and 22, when receiving a predetermined value "L" as the control signal NS before cut-off of power supply, output "H" as a predetermined fixed value. Therefore, the combinational circuit 10 receives "H" before cut-off of power supply, so that the logic gate circuits 11 and 13 output "L", while the logic gate circuits 12 and 14 output "H". In other words, the output of each of the logic gate circuits 11 to 14 goes to a desired state which was assumed during circuit design. Thus, when power supply is cut off, the output of each of the logic gates 11 to 14 of the combinational circuit 10 can be caused to go to a desired state, and when power supply is restored, the state of the combinational circuit 10 can be reliably and quickly put back to a state as it was before cut-off of power supply.

Embodiment 2

Embodiment 2 of the present invention is different from Embodiment 1 in the configuration of a flip-flop circuit as a data holding circuit which supplies an output to the combinational circuit 10 of FIG. 1.

In Embodiment 1, the flip-flop circuits 21 and 22 which supply outputs to the combinational circuit 10 of FIG. 1 are configured to output "H" as a predetermined fixed value during cut-off of power supply. Note that the flip-flop circuit which supplies an output to the combinational circuit 10 may be configured to output "L" as a predetermined fixed value. Also, in this case, when the output of the flip-flop circuit is "L", the high potential-side power supply end of the logic gate circuit which outputs "L" may be connected to the first pseudo-power supply line $V_{DDV}$, while the low potential-side power supply end thereof may be connected to the low potential power supply line $V_{SS}$, and on the other hand, the high potential-side power supply end of the logic gate circuit which outputs "H" may be connected to the high potential power supply line $V_{DD}$, while the low potential-side power supply end thereof may be connected to the second pseudo-power supply line $V_{SSV}$.

As described above, this embodiment is similar to Embodiment 1 in that the flip-flop circuit as the data holding circuit is configured to continue to hold data during cut-off of power supply. However, this embodiment is different from Embodiment 1 in that the flip-flop circuit is configured to output "L" as a predetermined fixed value when receiving a control signal and obtaining a predetermined value as the control signal.

Figure 4:
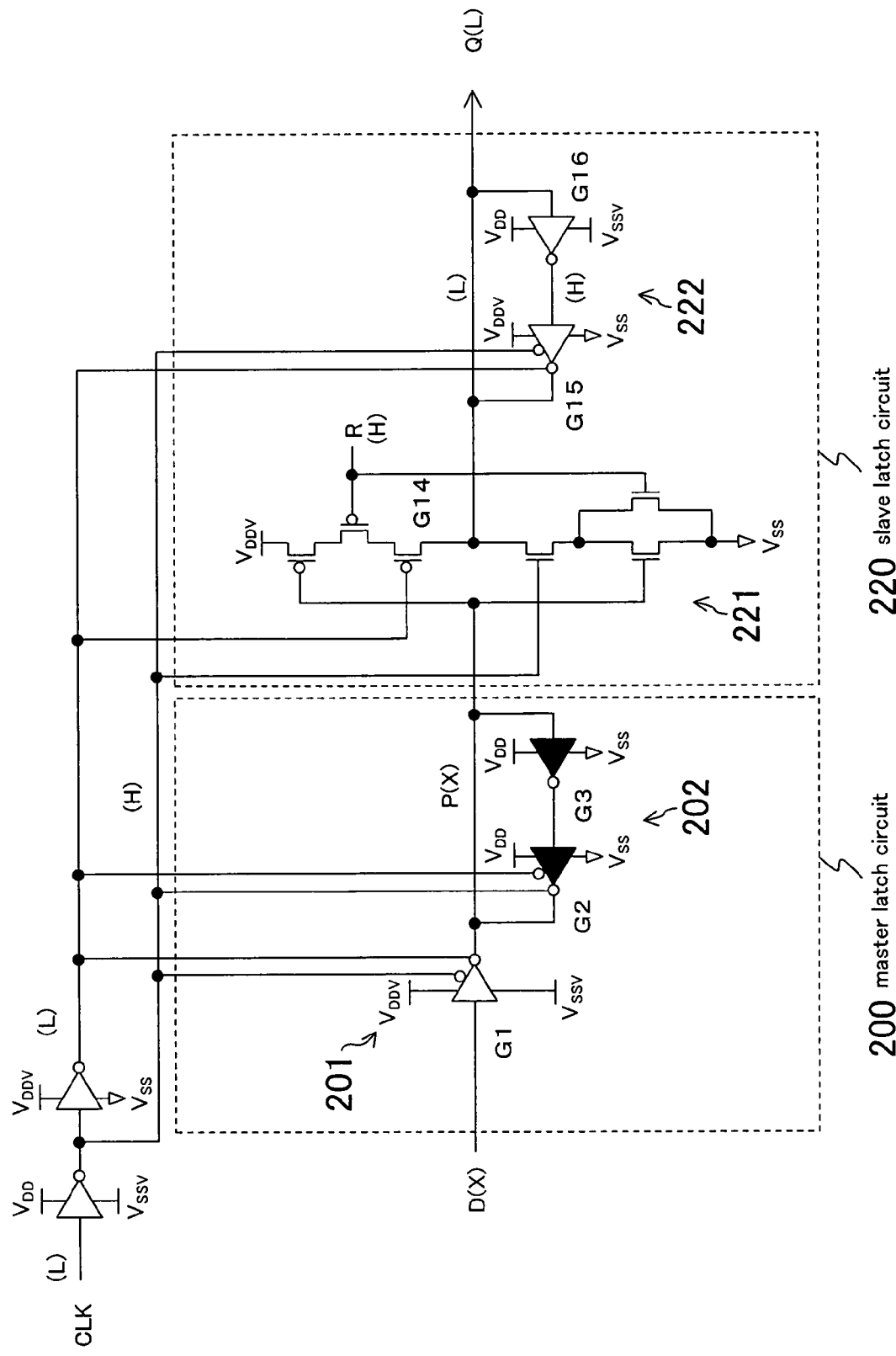
FIG. 4 is a circuit diagram showing an exemplary configuration of a flip-flop circuit according to Embodiment 2 of the present invention.

FIG. 4 is a circuit diagram showing an exemplary configuration of a flip-flop circuit according to this embodiment. In the configuration of FIG. 4, the flip-flop circuit comprises a master latch circuit 200 and a slave latch circuit 220. The master latch circuit 200 has a configuration similar to that of FIG. 2, and holds data during cut-off of power supply. The slave latch circuit 220 receives a control signal R, and when the control signal R is "H", outputs "L".

The slave latch circuit 220 comprises a second logic gate circuit 221 which receives an output of the master latch circuit 200, and a second data holding inverter circuit 222 which holds an output of the second logic gate circuit 221. The second logic gate circuit 221 comprises a clocked NOR circuit G14 which receives the control signal R through one input thereof. Specifically, the second logic gate circuit 221 has a reset function which is controlled by the control signal R, and when the control signal R is "H", outputs "L". A high potential-side power supply end of the clocked NOR circuit G14 is connected to the first pseudo-power supply line $V_{DDV}$. The second data holding inverter circuit 222 comprises a clocked inverter G15 and an inverter G16. A high potential-side power supply end of the clocked inverter G15 is connected to the first pseudo-power supply line $V_{DDV}$, while a low potential-side power supply end thereof is connected to the low potential power supply line $V_{SS}$. A high potential-side power supply end of the inverter G16 is connected to the high potential power supply line $V_{DD}$, while a low potential-side power supply end thereof is connected to the second pseudo-power supply line $V_{SSV}$.

The operation of the semiconductor integrated circuit device of this embodiment is substantially similar to that of Embodiment 1. Note that a control circuit (not shown) sets the control signal R to be "H" immediately before turning off the first and second power control transistors MP and MN. Thereby, in the slave latch circuit 220, the clocked NOR circuit G14 included in the second logic gate circuit 221 outputs "L" since the control signal R input to one input of the clocked NOR circuit G14 goes to "H". The output of the clocked inverter G15 included in the second data holding inverter circuit 222 goes to the Hi-Z state. Therefore, the slave latch circuit 220 can output "L" as the Q output.

In this embodiment, an effect similar to that of Embodiment 1 can be obtained. Specifically, the flip-flop circuit of this embodiment can continue to hold data during cut-off of power supply, and therefore, when power supply is restored, the flip-flop circuit can output data as it was held before cut-off power supply. Therefore, when power supply is restored, the combinational circuit which receives the output of the flip-flop circuit is reliably and quickly put back to a state as it was before cut-off of power supply. The flip-flop circuit, when receiving a predetermined value "H" as the control signal R before cut-off of power supply, outputs "L" as a predetermined fixed value. Therefore, the output of each logic gate circuit of the combinational circuit goes to a desired value which was assumed during circuit design. In other words, when power supply is cut off, the output of each logic gate of the combinational circuit can be caused to go to a desired value, and in addition, when power supply is restored, the state of the combinational circuit can be reliably and quickly put back to a state as it was before cut-off of power supply.

Embodiment 3

In Embodiment 3 of the present invention, a latch circuit is provided as a data holding circuit which supplies an output to the combinational circuit 10 of FIG. 1, instead of the flip-flop circuit.

It has been assumed in Embodiments 1 and 2 above that the output of the flip-flop circuit is supplied to the combinational circuit 10. Note that the data holding circuit which supplies an output to the combinational circuit 10 is not limited to flip-flop circuits, and may be, for example, a latch circuit as here described.

In this embodiment, the latch circuit as the data holding circuit is configured to be able to continue to hold data during cut-off of power supply. The latch circuit is also configured to receive a control signal, and when the control signal has a predetermined value, output a predetermined fixed value. It is here assumed that the predetermined fixed value is "H".

Figure 5:
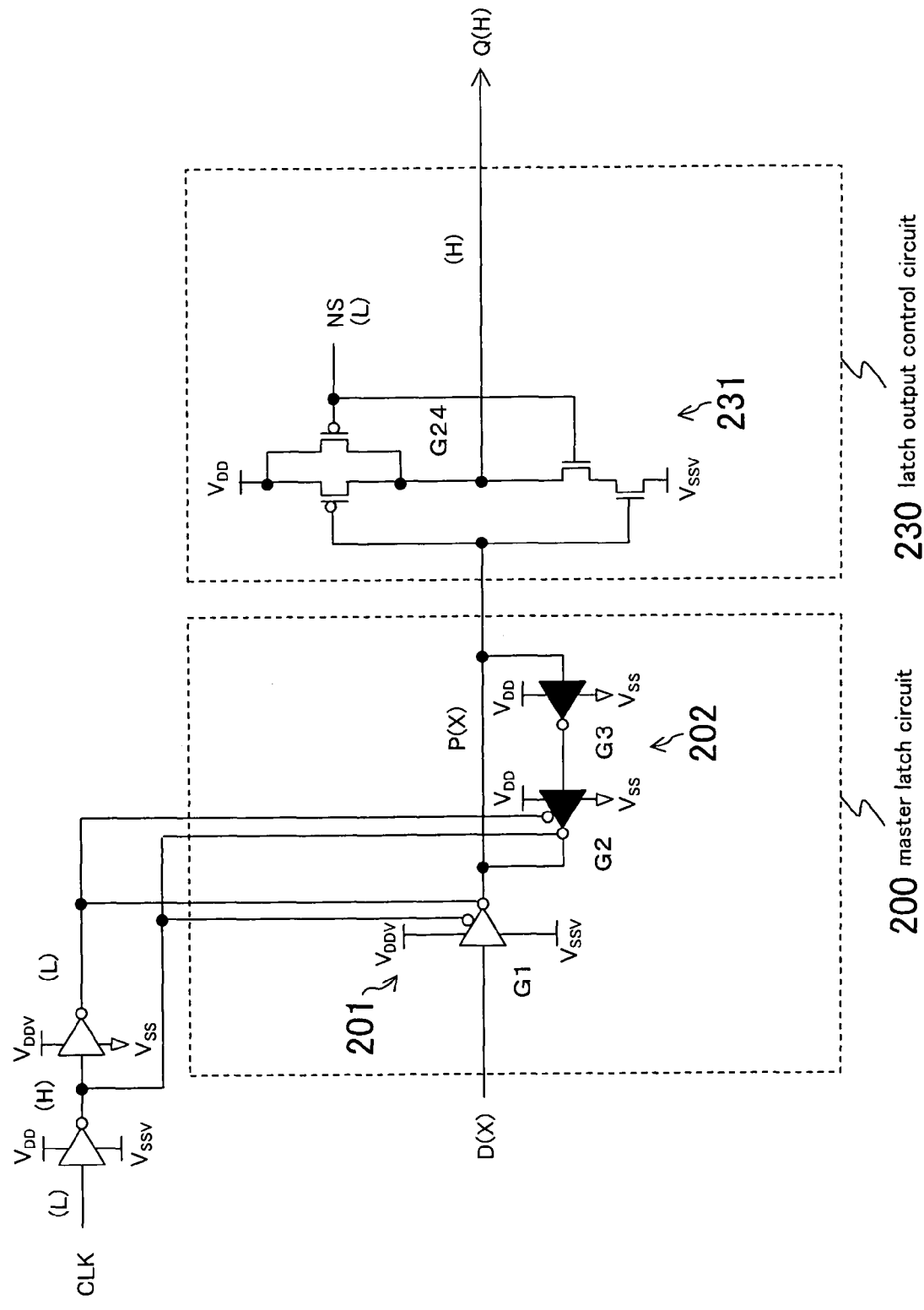
FIG. 5 is a circuit diagram showing an exemplary configuration of a latch circuit according to Embodiment 3 of the present invention.

FIG. 5 is a circuit diagram showing an exemplary configuration of a latch circuit according to this embodiment. In the configuration of FIG. 5, the latch circuit comprises a master latch circuit 200 and a latch output control circuit 230. The master latch circuit 200 has a configuration similar to that of FIG. 2, and holds data during cut-off of power supply. The latch output control circuit 230 receives a control signal NS, and when the control signal NS is "L", outputs "H".

The latch output control circuit 230 comprises a second logic gate circuit 231 which receives an output of the master latch circuit 200. The second logic gate circuit 231 comprises a NAND circuit G24 which receives the control signal NS through one input thereof. Specifically, the second logic gate circuit 231 outputs "H" when the control signal NS is "L".

In this embodiment, the control circuit (not shown) sets the control signal NS to be "L" immediately before turning off the first and second power control transistors MP and MN. Thereby, the NAND circuit G24 included in the second logic gate circuit 231 of the latch output control circuit 230 outputs "H" since the control signal NS input to one input of the NAND circuit G24 goes to "L". Therefore, the latch output control circuit 230 can output "H" as the Q output.

Also in this embodiment, an effect similar to that of Embodiment 1 can be obtained. Specifically, the latch circuit of this embodiment can continue to hold data during cut-off of power supply, and therefore, when power supply is restored, can output data as it was held before cut-off of power supply. Therefore, when power supply is restored, the combinational circuit which receives the output of the latch circuit can be reliably and quickly put back to a state as it was before cut-off of power supply. Also, the latch circuit, when receiving a predetermined value "L" as the control signal NS before cut-off of power supply, outputs "H" as a predetermined fixed value. Therefore, the output of each logic gate circuit of the combinational circuit goes to a desired state which was assumed during circuit design. Specifically, when power supply is cut off, the output of each logic gate of the combinational circuit can be caused to go to a desired state, and when power supply is restored, the state of the combinational circuit can be reliably and quickly put back to a state as it was before cut-off of power supply.

Embodiment 4

Embodiment 4 of the present invention is different from Embodiment 3 in the configuration of a latch circuit as the data holding circuit which supplies an output to the combinational circuit 10 of FIG. 1.

Specifically, this embodiment is similar to Embodiment 3 in that the latch circuit as the data holding circuit is configured to be able to continue to hold data during cut-off of power supply. This embodiment is different from Embodiment 3 in that the latch circuit is configured to output "L" as a predetermined fixed value when receiving a control signal and obtaining a predetermined value as the control signal.

Figure 6:
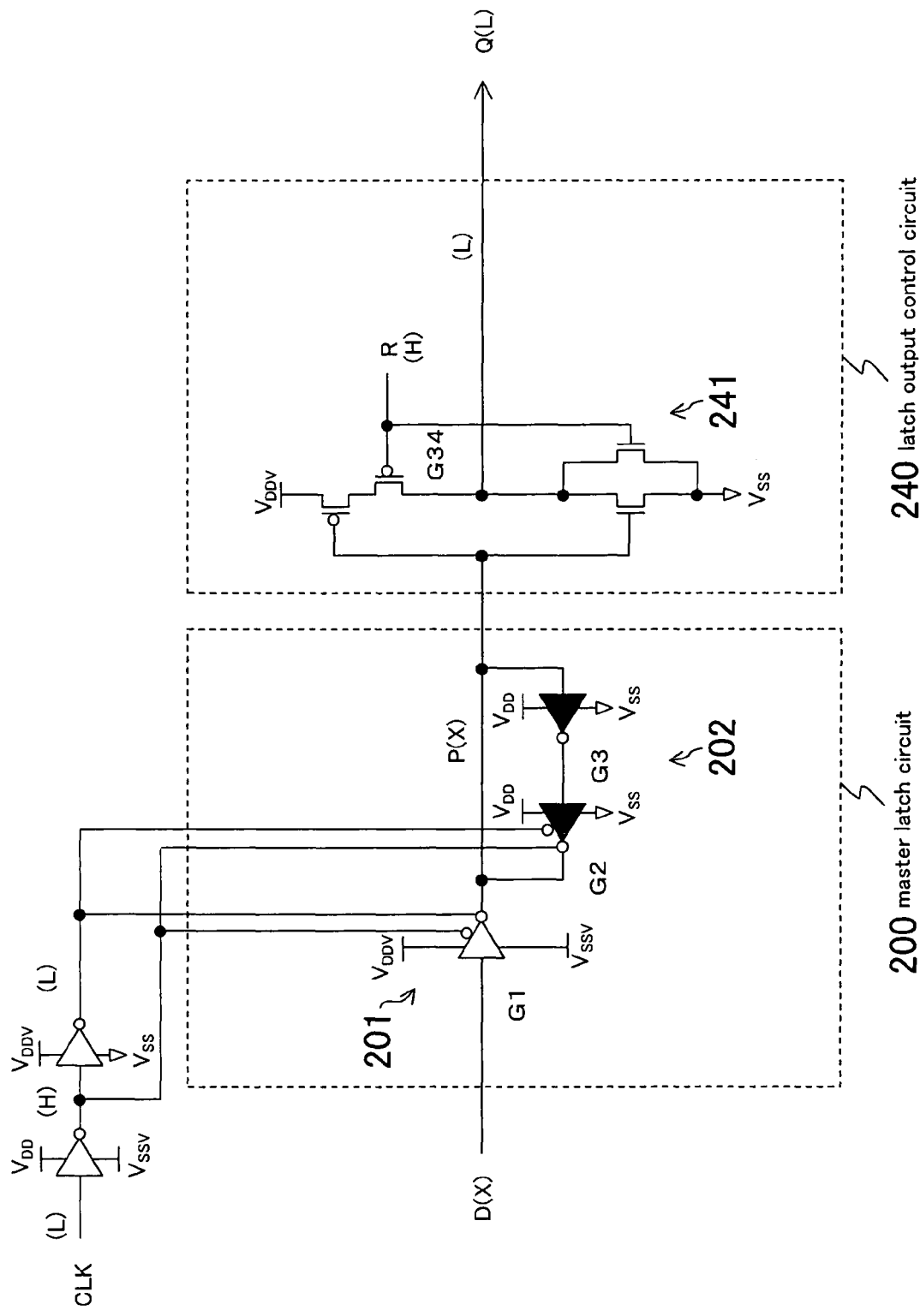
FIG. 6 is a circuit diagram showing an exemplary configuration of the latch circuit of Embodiment 4 of the present invention.

FIG. 6 is a circuit diagram showing an exemplary configuration of the latch circuit of this embodiment. In the configuration of FIG. 6, the latch circuit comprises a master latch circuit 200 and a latch output control circuit 240. The master latch circuit 200 has a configuration similar to that of FIG. 2, and holds data during cut-off of power supply. The latch output control circuit 240 receives a control signal R, and when the control signal R is "H", outputs "L".

The latch output control circuit 240 comprises a second logic gate circuit 241 which receives an output of the master latch circuit 200. The second logic gate circuit 241 comprises a NOR circuit G34 which receives the control signal R through one input thereof. Specifically, the second logic gate circuit 241 outputs "L" when the control signal R is "H".

In this embodiment, a control circuit (not shown) sets the control signal R to be "H" immediately before turning off the first and second power control transistors MP and MN. Thereby, the NOR circuit G34 including the second logic gate circuit 241 in the latch output control circuit 240 outputs "L" since the control signal R input to one input of the NOR circuit G34 goes to "H". Therefore, the latch output control circuit 240 can output "L" as the Q output.

Also in this embodiment, an effect similar to that of Embodiment 1 can be obtained. Specifically, the latch circuit of this embodiment can continue to hold data during cut-off of power supply, and therefore, when power supply is restored, can output data as it was held before cut-off of power supply. Therefore, when power supply is restored, the combinational circuit which receives the output of the latch circuit can be reliably and quickly put back to a state as it was before cut-off of power supply. Also, the latch circuit, when receiving a predetermined value "H" as the control signal R before cut-off of power supply, outputs "L" as a predetermined fixed value. Therefore, the output of each logic gate circuit of the combinational circuit goes to a desired state which was assumed during circuit design. Specifically, when power supply is cut off, the output of each logic gate of the combinational circuit can be caused to go to a desired state, and when power supply is restored, the state of the combinational circuit can be reliably and quickly put back to a state as it was before cut-off of power supply.

Embodiment 5

Figure 7:
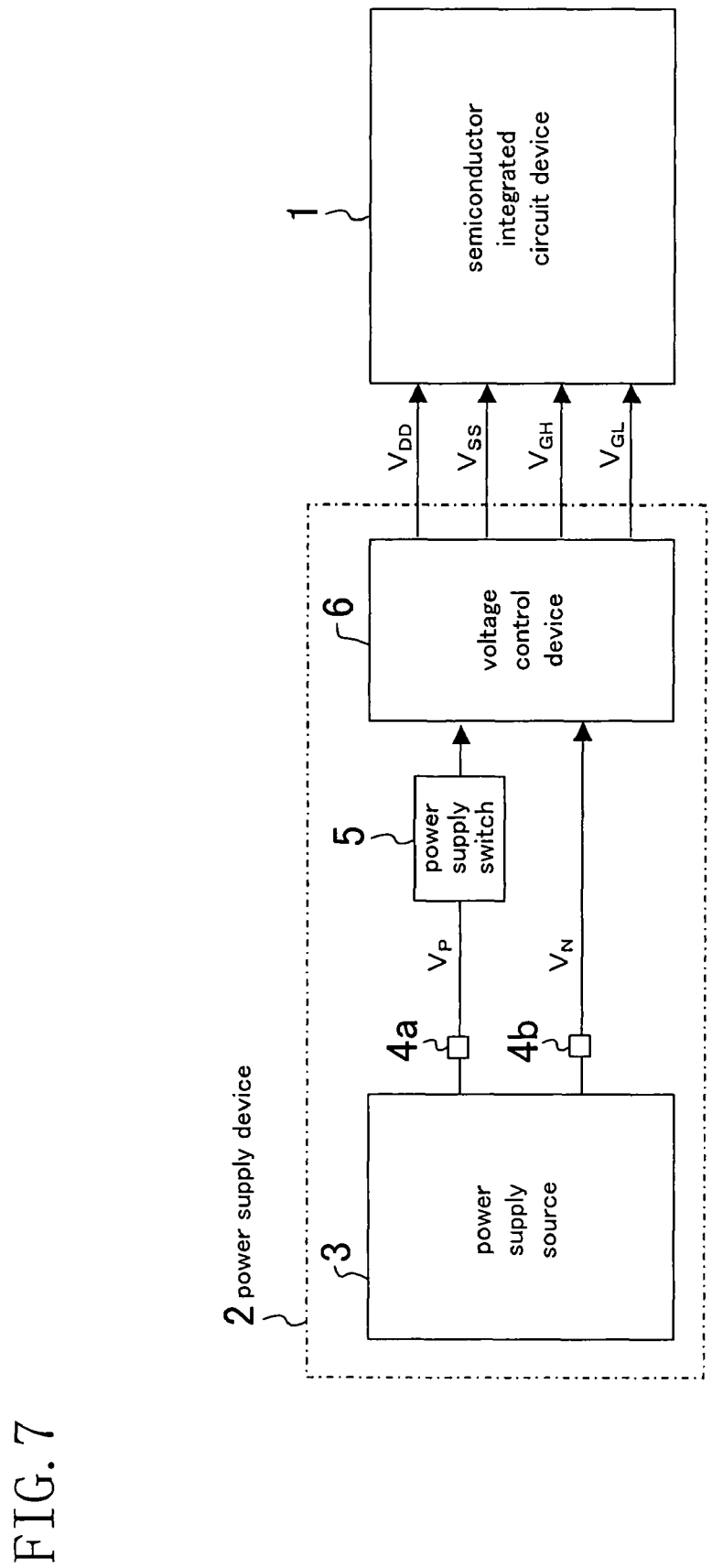
FIG. 7 is a block diagram showing a configuration of an electronic device according to Embodiment 5 of the present invention.
Figure 8:
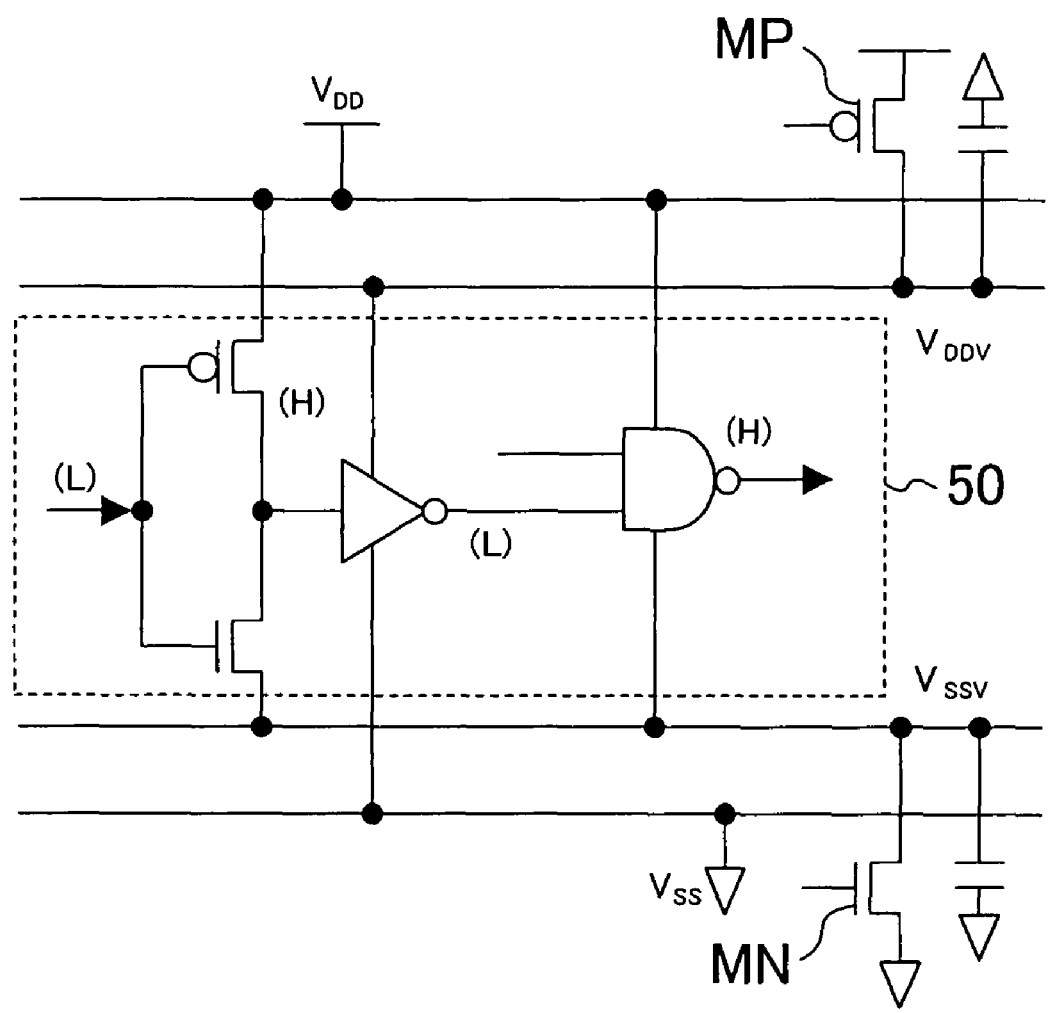
FIG. 8 shows a circuit configuration of a ZSCCMOS circuit.
Figure 9:
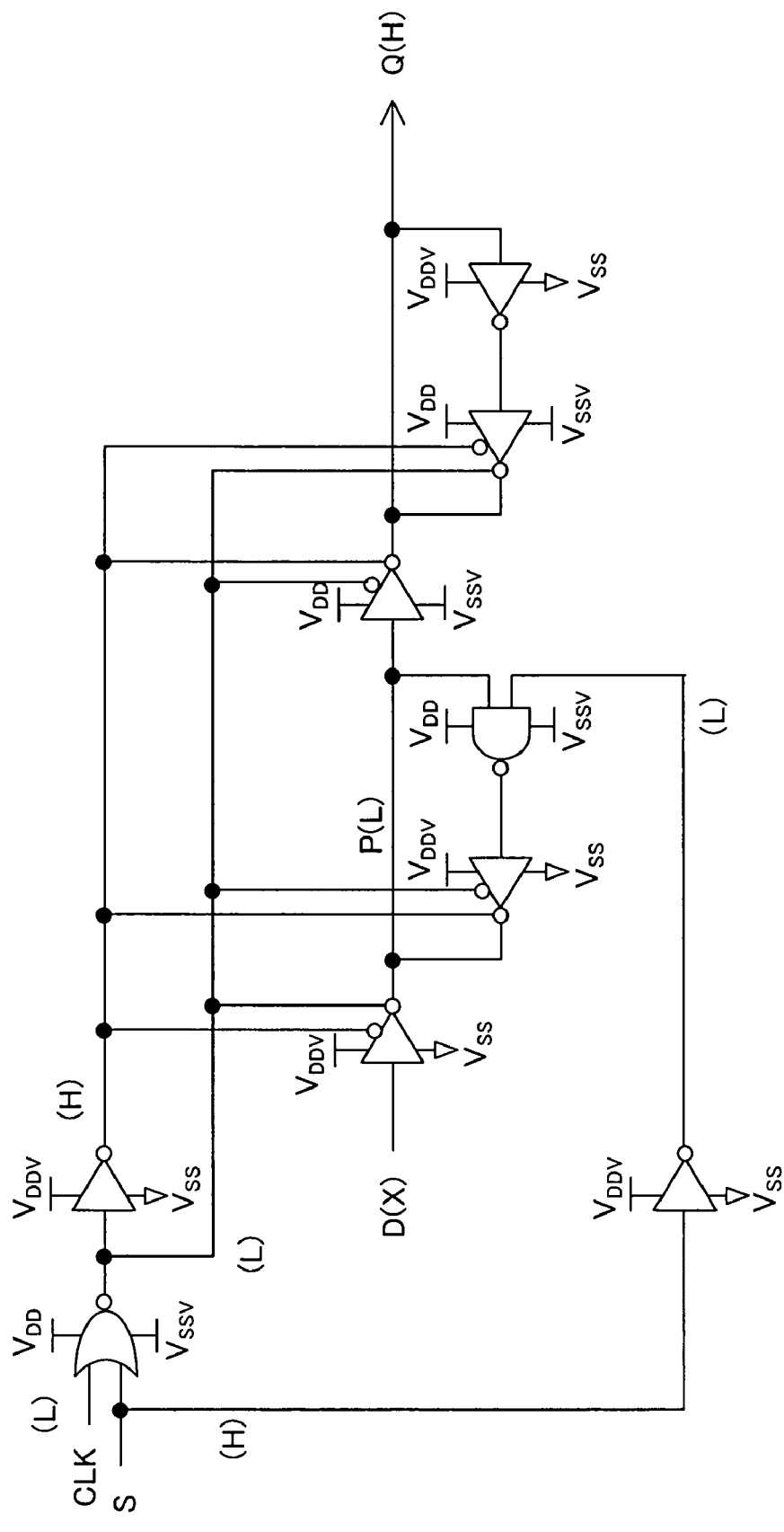
FIG. 9 is a circuit diagram showing a configuration of a conventional flip-flop circuit.
Figure 10:
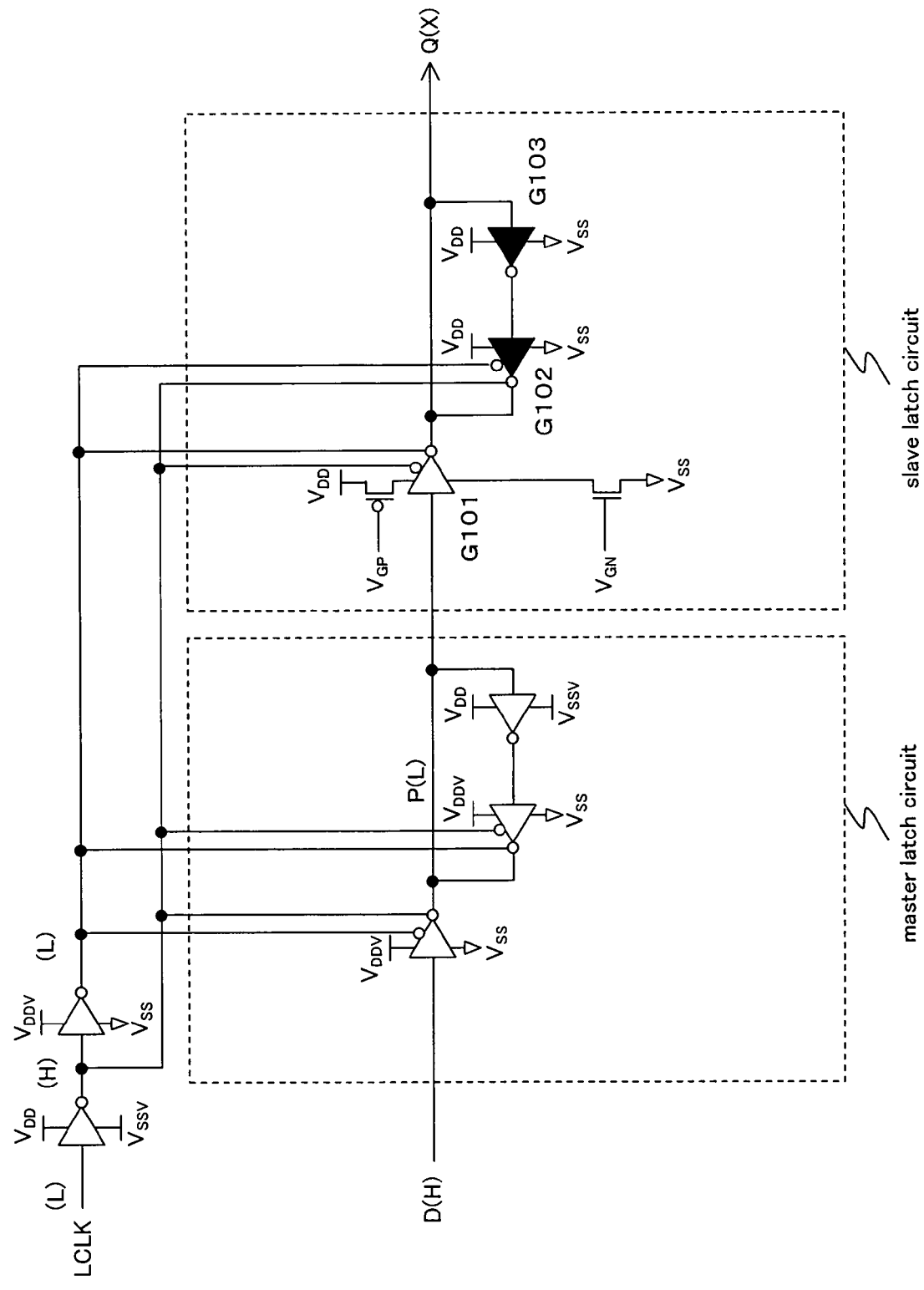
FIG. 10 is a circuit diagram showing a configuration of a conventional flip-flop circuit.

FIG. 7 is a block diagram showing a configuration of an electronic device according to Embodiment 5 of the present invention. In FIG. 7, the electronic device comprises a semiconductor integrated circuit device 1, and a power supply device 2 which supplies power to the semiconductor integrated circuit device 1. As the semiconductor integrated circuit device 1, any of the semiconductor integrated circuit devices described in detail in Embodiments 1 to 4 above can be applied. As this electronic device, a mobile telephone, a DVD decoder or the like may be specifically assumed.

The power supply device 2 comprises a power supply source 3 (e.g., a battery, an AC-DC converter, etc.), power supply input terminals 4*a* and 4*b* through which a power supply voltage generated by the power supply source 3 is input, a power supply switch 5 which turns on/off the power supply voltage, and a voltage control device 6 which receives the power supply voltage of the power supply source 3 to generate and supply a voltage required for the semiconductor integrated circuit device 1.

The electronic device in which a battery is used as the power supply source 3 is considerably useful as a portable device requiring a long operating time. The electronic device in which an AC-DC converter is used as the power supply source 3 can be expected to have an effect of reducing power.

Note that the description above only illustrates preferred embodiments of the present invention, and the present invention is not limited to this.

Although the term "semiconductor integrated circuit device" is herein used for the sake of convenience, the terms "semiconductor integrated circuit", "logic circuit" or the like may be used.

Further, the types, numbers, connection manners, and the like of circuit sections, such as a level converting circuit and the like, which constitute the above-described integrated circuit device are not limited to those of the embodiments above.

Also, the number of data holding circuits and the circuit configuration are not limited to those of the embodiment above.

The embodiments above may be each implemented for each of a plurality of circuit blocks into which a substrate is electrically separated.

Further, the present invention is applicable not only to a semiconductor integrated circuit comprising MOS transistors provided on a typical silicon substrate, but also to a semiconductor integrated circuit comprising MOS transistors having the SOI (Silicon On Insulator) structure.

For example, the first and second power supply control transistors MP and MN may be formed on a silicon substrate having the SOI structure. Thereby, it is advantageously possible to avoid a latchup. Also, the transistors constituting the data holding circuit and the combinational circuit may be formed on a silicon substrate having the SOI structure.

The present invention is considerably effective as a means for achieving both low power consumption and high performance of a semiconductor integrated circuit.

What is claimed is:

1. A semiconductor integrated circuit device comprising:
at least one data holding circuit;
a combinational circuit including a plurality of logic gate circuits and for receiving an output of the data holding circuit;
a high potential power supply line and a low potential power supply line;
a first pseudo-power supply line connected via a first power control transistor to the high potential power supply line; and
a second pseudo-power supply line connected via a second power control transistor to the low potential power supply line,
wherein, of the plurality of logic gate circuits of the combinational circuit, one outputting "L" when the output of the data holding circuit has a predetermined fixed value has a high potential-side power supply end connected to the first pseudo-power supply line and a low potential-side power supply end connected to the low potential power supply line, and one outputting "H" when the output of the data holding circuit has the predetermined fixed value has a high potential-side power supply end connected to the high potential power supply line and a low potential-side power supply end connected to the second pseudo-power supply line,
the data holding circuit can continue to hold data during cut-off of power supply which turns off the first and second power control transistors, and
the data holding circuit receives a control signal, and when obtaining a predetermined value as the control signal, the data holding circuit can output the predetermined fixed value,
wherein:
the data holding circuit is a flip-flop circuit having a master latch circuit and a slave latch circuit;
the master latch circuit holds data during cut-off of power supply; and
the slave latch circuit outputs the predetermined fixed value when the control signal has the predetermined value, and
wherein:
the master latch circuit comprises:
a first logic gate circuit for receiving a D input; and
a first data holding inverter circuit for holding an output of the first logic gate circuit, and having a high potential-side power supply end and a low potential-side power supply end connected to the high potential power supply line and the low potential power supply line, respectively, and the slave latch circuit comprises:
a second logic gate circuit for receiving an output of the master latch circuit and the control signal, and when the control signal has the predetermined value, outputting the predetermined fixed value; and
a second data holding inverter circuit for holding an output of the second logic gate circuit.

2. An electronic device comprising:
the semiconductor integrated circuit device of claim 1; and
a power supply device for supplying power to the semiconductor integrated circuit device.

3. A semiconductor integrated circuit device comprising:
at least one data holding circuit;
a combinational circuit including a plurality of logic gate circuits and for receiving an output of the data holding circuit;
a high potential power supply line and a low potential power supply line;
a first pseudo-power supply line connected via a first power control transistor to the high potential power supply line; and
a second pseudo-power supply line connected via a second power control transistor to the low potential power supply line,
wherein, of the plurality of logic gate circuits of the combinational circuit, one outputting "L" when the output of the data holding circuit has a predetermined fixed value has a high potential-side power supply end connected to the first pseudo-power supply line and a low potential-side power supply end connected to the low potential power supply line, and one outputting "H" when the output of the data holding circuit has the predetermined fixed value has a high potential-side power supply end connected to the high potential power supply line and a low potential-side power supply end connected to the second pseudo-power supply line,
the data holding circuit can continue to hold data during cut-off of power supply which turns off the first and second power control transistors, and
the data holding circuit receives a control signal, and when obtaining a predetermined value as the control signal, the data holding circuit can output the predetermined fixed value,
wherein:
the data holding circuit is a latch circuit having a master latch circuit and a latch output control circuit,
the master latch circuit holds data during cut-off of power supply, and
the latch output control circuit outputs the predetermined fixed value when the control signal has the predetermined value, and
wherein:
the master latch circuit comprises:
a first logic gate circuit for receiving a D input; and
a first data holding inverter circuit for holding an output of the first logic gate circuit, and having a high potential-side power supply end and a low potential-side power supply end connected to the high potential power supply line and the low potential power supply line, respectively, and
the latch output control circuit comprises:
a second logic gate circuit for receiving an output of the master latch circuit and the control signal, and when the control signal has the predetermined value, outputting the predetermined fixed value.

4. An electronic device comprising:
the semiconductor integrated circuit device of claim 3; and
a power supply device for supplying power to the semiconductor integrated circuit device.

* * * * *